United States Patent [19]

Tate et al.

[11] 4,284,214
[45] Aug. 18, 1981

[54] METHOD OF CONTINUOUS CASTING

[75] Inventors: Masahisa Tate; Tetsuya Yoshiwara; Tatsuo Kobatake, all of Yokohama, Japan

[73] Assignee: Nippon Kokan Kabushiki Kaisha, Tokyo, Japan

[21] Appl. No.: 101,272

[22] Filed: Dec. 5, 1979

Related U.S. Application Data

[63] Continuation of Ser. No. 922,805, Jul. 7, 1978, abandoned.

[30] Foreign Application Priority Data

Jul. 13, 1977 [JP] Japan .................................. 52-82883

[51] Int. Cl.³ .............................................. B22D 41/08
[52] U.S. Cl. .................................... 222/590; 222/598
[58] Field of Search ...................... 222/1, 56, 590, 598, 222/600

[56] References Cited

U.S. PATENT DOCUMENTS

| | | | |
|---|---|---|---|
| 3,264,047 | 10/1973 | Inoue et al. | 222/598 |
| 3,430,644 | 3/1969 | Lyman | 222/598 |
| 3,457,985 | 7/1969 | Wilson | 222/56 X |
| 3,850,351 | 11/1974 | Yoshihara | 222/598 |

FOREIGN PATENT DOCUMENTS

| | | | |
|---|---|---|---|
| 2212312 | 5/1973 | Fed. Rep. of Germany. | |
| 39-2215 | 4/1964 | Japan | 222/598 |
| 49-115023 | 3/1973 | Japan. | |

OTHER PUBLICATIONS

Tanaka, *Iron and Steel Engineer*, Sep. 1973, vol. 50, No. 9, pp. 117-124.

*Primary Examiner*—David A. Scherbel
*Attorney, Agent, or Firm*—Haseltine & Lake

[57] ABSTRACT

A method for automatic pouring of molten metal from a ladle into a tundish through the use of a rotary nozzle, wherein the pouring operation between a ladle and a tundish in continuous casting of metal is effected by a rotary nozzle, and a plurality of pouring nozzles having different diameters are mounted on the rotary nozzle, whereby the pouring nozzles are used alternately by 100% fully opening and closing the same. The plurality of pouring nozzles with different diameters include at least a pouring nozzle whose pouring rate for wide open pouring is greater than that required to maintain the level of the molten metal in the tundish at a predetermined reference level and another pouring nozzle whose pouring rate for wide open pouring is less than that required to maintain the predetermined reference level.

4 Claims, 19 Drawing Figures

— POWER CIRCUIT
---- CONTROL CIRCUIT

FIG. IIA — WIDE OPEN 50mm⌀ NOZZLE

FIG. IIB — THROTTLED 70mm⌀ NOZZLE (70% OPEN)

FIG. 12

METHOD OF CONTINUOUS CASTING

This is a continuation of application Ser. No. 922,805 filed July 7, 1978 now abandoned.

BACKGROUND OF THE INVENTION

With a known method of pouring molten metal from a ladle into a tundish in continuous casting of metal, a single-opening nozzle is used and the liquid level of the tundish is controlled by a so-called throttling pouring which changes the opening area of the nozzle. A disadvantage of this prior art method is that the molten metal poured by the throttling pouring results in an unbrella-like stream as will be described later thus inevitably causing oxidation of the poured molten metal stream by air, and moreover the most serious drawback of the throttling pouring will be a reduced life of the refractory brick, i.e., the fixed plate brick, sliding plate brick, etc., due to the damages to their portions around the nozzle opening.

Figure 11A:
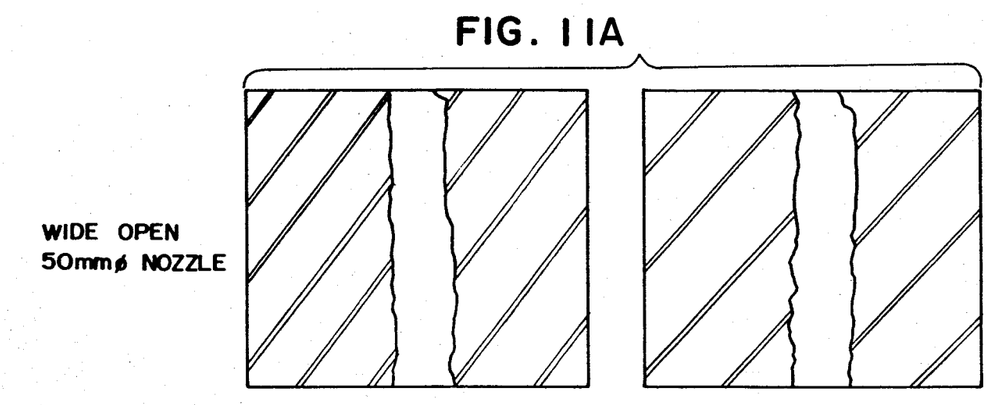
Figure 11B:
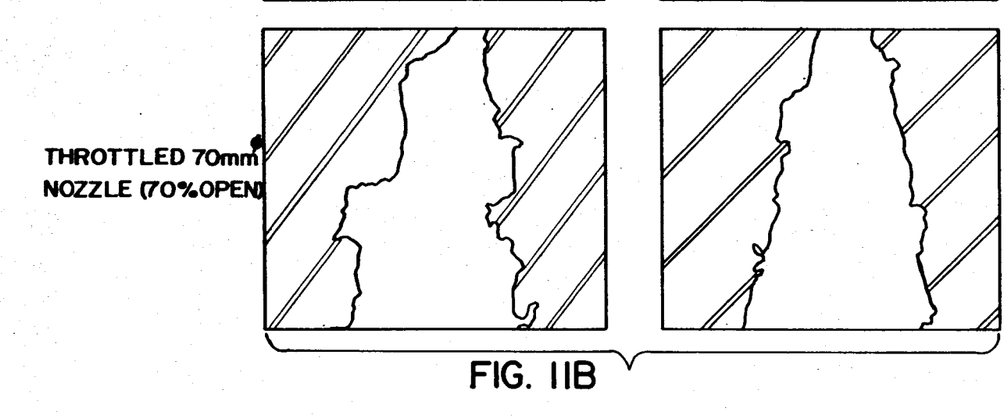

The inventor, etc, have discovered by experiments that the prior art throttling pouring with a single-opening nozzle causes formation of a large amount of large-sized inclusions in cast slabs and that the wide open pouring without any throttling operation has the effect of very greatly reducing the trapping of air in the poured molten metal stream and thereby preventing oxidation of the pouring stream by the trapped air and reducing the formation of large-sized inclusions in cast slabs. This is believed to result from the following reasons. In other words, with the prior art pouring method, a throttling pouring is employed in which the nozzle openings of a fixed plate and sliding plate are selected practically the same or different from each other and the centers of the nozzle bores are offset to vary the effective opening area. As a result, when the poured molten metal stream passes through the offset portions, the molten metal stream is caused to eddy in the vicinity of the offset portions so that melting loss of the refractory bricks will be promoted and the flow line of the poured molten metal stream will be disturbed, thus affecting the molten metal stream just below the nozzle and thereby disturbing the molten metal stream. On the contrary, the wide open pouring is believed to cause no trapping of air in the molten metal stream, since the wide open pouring does not cause any eddy of the molten metal and disturbance of the flow line and the molten metal stream flows as an undisturbed stream. These conditions will be explained with reference to FIG. 11 which is a traced copy of a photograph taken by a high speed camera and showing the flowing conditions of the poured molten metal stream just below the ladle nozzle, with FIG. 11(A) showing the conditions obtained with a wide open nozzle having a nozzle diameter of 50 mm$\phi$ and FIG. 11(B) showing the conditions obtained with a throttled (70%—open), nozzle having a nozzle diameter of 70 mm$\phi$. As will be seen from these Figures, there was no disturbance of the molten metal stream in the case of the wide open pouring, and the throttled pouring caused a considerable disturbance of the molten metal steram.

In summary, it is essential for the production of good quality cast slabs to use a rotary nozzle assembly having a plurality of nozzles of different diameters which meet the requirements for ensuring the required pour throughout the pouring period when pouring molten metal from a ladle into a tundish and to effect the pouring by selectively opening fully these nozzles and causing the molten metal to flow as a normal flow, and the previously mentioned essence of this invention attributes to this point.

SUMMARY OF THE INVENTION

The present invention has been made on the basis of this discovery with a view to overcoming the above-mentioned deficiencies of the prior art, and thus the present invention comprises a method of automatically pouring molten metal from a ladle into a tundish through the use of a rotary nozzle assembly wherein for pouring molten metal from a ladle into a tundish in the continuous casting of metal, a rotary nozzle assembly is attached to the ladle to maintain the level of molten metal in the tundish within the upper and lower limit levels in relation to a predetermined reference level, and the rotary nozzle assembly comprises a plurality of pouring nozzles having different diameters and including at least a pouring nozzle which when opened fully ensures a pour greater than the amount of molten metal required to maintain the reference level and another pouring nozzle which when opened fully ensures a pour smaller than the amount of molten metal required to maintain the reference level, whereby the pouring nozzles are controlled to open and close in accordance with the level of molten metal in tundish.

It is therefore an object of the present invention to provide the automatic molten metal pouring method whereby when molten metal is poured from a ladle into a tundish in the continuous casting of metal, oxidation of the molten metal stream by air is prevented to thereby improve the quality of cast slabs.

It is another object of the present invention to provide an automatic molten metal pouring method which reduces melting loss of the refractory bricks, such as, the fixed plate, sliding plate, etc., and ensures a longer useful life of the bricks.

It is still another object of the present invention to provide an automatic molten metal pouring method which ensures saving of labor and increased range of operations for the ladle pouring operator.

Those and other objects, features and advantages of the invention will become more apparent from the following description taken in conjunction with the accompanying drawings.

BRIEF DESCRIPTION OF THE DRAWINGS

FIGS. 3(A) and 3(B) are a plan view and detailed partial sectional view of the embodiment of FIG. 2 with the pouring nozzles placed in their fully closed positions.

FIGS. 4(A) and 4(B) and FIGS. 5(A) and 5(B) show respectively plan views and partial sectional views of another embodiments each including three pouring nozzles;

FIG. 11 are traced schematic diagrams of photographs taken by a high speed camera and showing comparatively the conditions of the poured molten metal stream just below the ladle nozzle which were obtained by the wide open pouring and throttled pouring, respectively, with FIG. 11(A) showing the conditions with a wide open nozzle of 50 mm$\phi$ and FIG. 11(B) showing the conditions obtained with a throttled (70%—open) nozzle of 70 mm$\phi$ diameter.

FIG. 13 are traced schematic diagrams of the photographs showing the uneven distribution of inclusions in the continuously cast slabs, with FIG. 13(A) showing the case of the wide open pouring and FIG. 13(B) showing the case of the throttled pouring.

DESCRIPTION OF THE PREFERRED EMBODIMENTS

The selection of pouring nozzles used with the present invention will be made in consideration of the following two points. (1) That the flow rate per unit time of molten metal from the pouring nozzle of a ladle decreases with the time elapsed from the start of the pouring operation due to a decrease in the flow rate with a decrease in the static pressure of the molten metal in the ladle and due to a decrease in the inner diameters of the openings in the refractory bricks caused by the deposition of alumina to the openings. (2) That the continuous casting operation must be performed by maintaining the pouring rate at a constant value and consequently the amount of molten metal flow must be always maintained constant throughout the pouring time.

Figure 1:
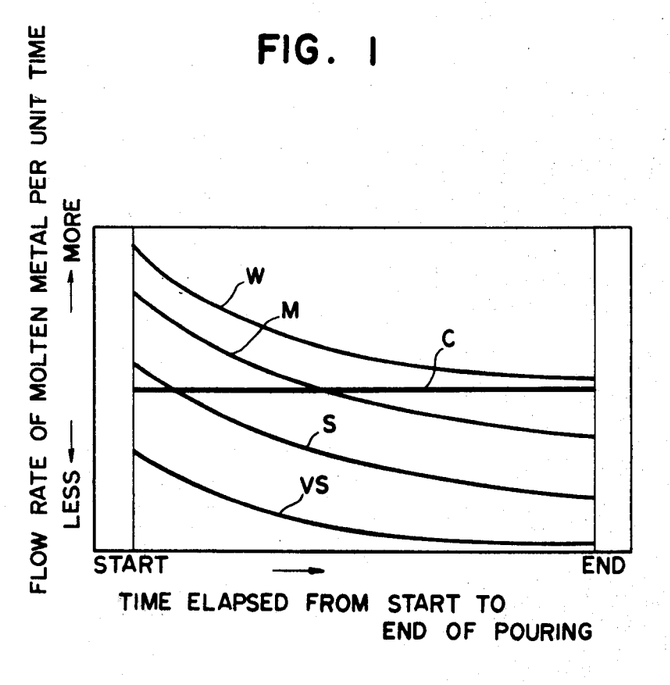
FIG. 1 is a graph showing the relationship between the time elapsed from the start of the pouring and the amount of molten metal flow per unit time for the pouring nozzles used with the present invention.

These points will now be described in greater detail with reference to FIG. 1. The pouring nozzles of different diameters constituting an important feature of this invention, i.e., a large nozzle (W), small nozzle (S), very small nozzle (VS) and medium nozzle (M) respectively have the relationship between the flow rate (pour) of molten metal per unit time and the time interval between the beginning and end of the pouring in the continuous casting of metal as shown by the curves in the Figure. As a result, the large nozzle maintains throughout the priod a molten metal flow rate per unit time which is higher than the desired pour or reference level C for continuous casting shown in the Figure, and the small nozzle has a molten metal flow rate which is slightly higher than the reference level during the initial period of the pouring and which becomes insufficient later. The very small nozzle is not provided to pour any substantial amount of molten metal but the very small nozzle is used to prevent the solidification of molten metal by holding it fully open only when the other nozzles are left closed for a long period of time. The medium nozzle has a flow characteristic which is intermediary of those of the large and small nozzles, and the medium nozzle is used from time to time as occasions demand.

In this case, while the setting of a required amount of pour or the reference level C to which the molten metal level of a tundish is to be controlled is dependent on the continuous casting machine and the pouring method used, in actual operation it is difficult to always maintain the liquid level at the reference level and consequently the liquid level is controlled to vary on both sides of the reference level within an allowable range of variations. In accordance with the present invention, the upper and lower limits of this allowable range are referred to respectively as upper and lower limit levels.

Figures 2, 3:
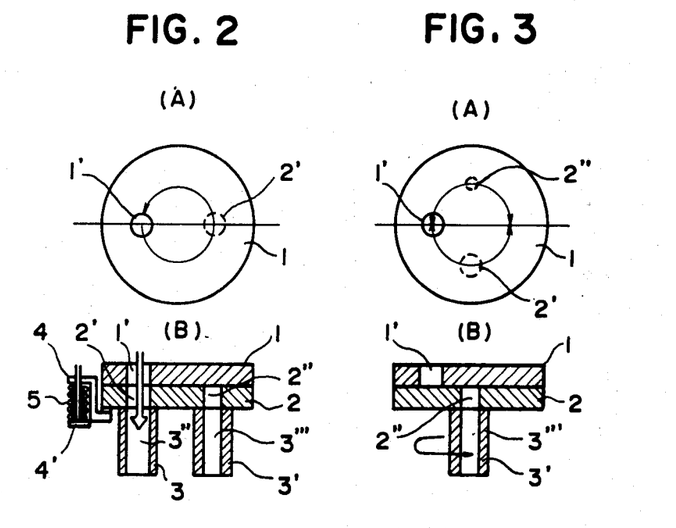
FIGS. 2 through 5 show embodiments of a rotary nozzle assembly of this invention which is mounted to a ladle, with FIGS. 2(A) and 2(B) showing a plan view and sectional view of an embodiment including a large diameter pouring nozzle and small diameter pouring nozzle with the large diameter pouring nozzle placed in its fully opened position.

FIGS. 2 to 5 show some embodiments of a rotary nozzle assembly of this invention mounted to a ladle, and FIG. 2 shows an embodiment in which a large diameter nozzle and a small diameter nozzle are arranged on the same circumference at 180° spacing and the large diameter nozzle is placed in the fully open position. FIG. 3 shows the same embodiment in which the two pouring nozzles are in their fully closed positions. In the Figures, numeral 1 designates a fixed plate, and 1' a pouring opening. The fixed plate 1 is fixed in place in such a manner that the pouring opening 1' is aligned with the molten metal nozzle opening in the bottom of a ladle which is not shown. Numeral 2 designates a sliding plate, 2' a large pouring opening of the sliding plate 2 having practically the same diameter as the pouring opening 1', and 3 a large nozzle fixedly mounted in position below the large pouring opening 2'. Numeral 2" designates a small pouring opening of the sliding plate 2, and a small nozzle 3' is fixedly mounted in position below the small pouring opening 2". Numerals 3" and 3''' designate nozzle openings. The sliding plate 2 is supported in such a manner that the sliding plate 2 is rotatable along the lower surface of the fixed plate 1 while being pressed thereagainst with a fixed pressure and in sliding contact therewith. Numeral 4 designates a sliding plate supporting frame, 4' a bolt for fastening the supporting frame to the ladle shell, and 5 a spring.

Figure 4:
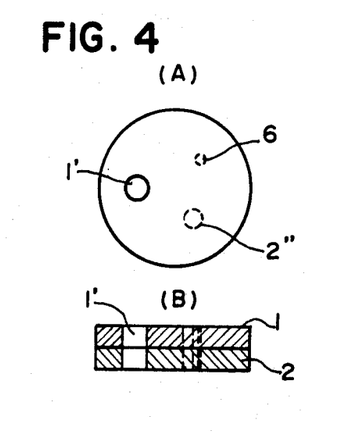
Figure 5:
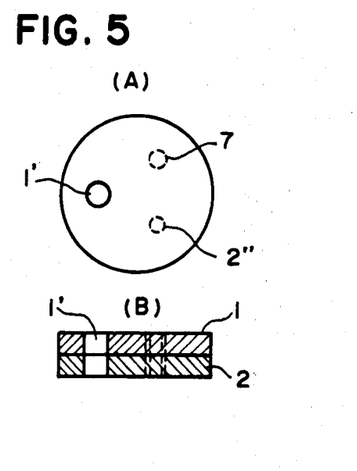

FIG. 4 shows another embodiment of the rotary nozzle assembly in which three pouring nozzles are arranged on the same circumference at 120° spacing, and the assembly comprise a large diameter nozzle, a small diameter nozzle and a very small nozzle having a nozzle diameter of the order of 15 mm$\phi$. In the Figure, numeral 6 designates the very small nozzle. FIG. 5 shows still another embodiment of the rotary nozzle assembly which differs from the embodiment of FIG. 4 in that the very small pouring nozzle is replaced by a pouring nozzle of a medium diameter. In the Figure, numeral 7 designates the very small nozzle.

Figure 6:
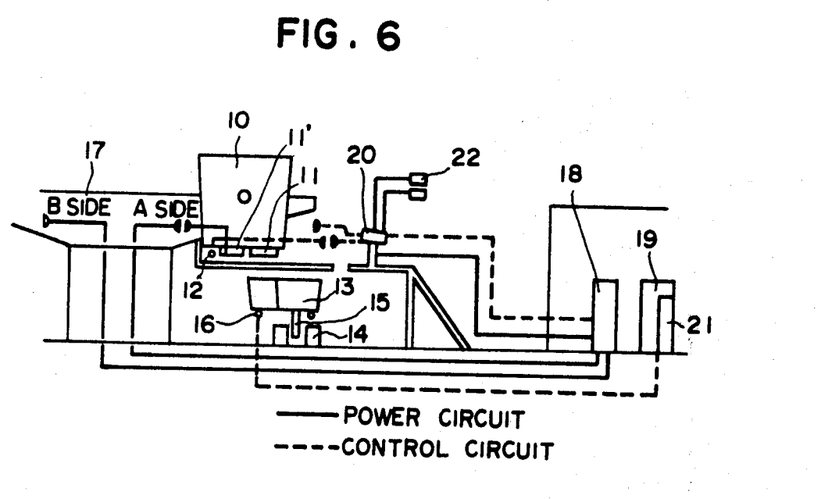
FIG. 6 is a circuit diagram useful in explaining the automatic pouring method of this invention.

FIG. 6 is a circuit diagram for performing the automatic pouring method of this invention. In the Figure, numeral 10 designates a ladle, and 11 a rotary nozzle assembly attached to the molten metal nozzle opening in the bottom of the ladle 10 and having a detailed construction as shown in FIGS. 2 to 5. Numeral 11' designates an electric motor for slidingly rotating the rotary nozzle assembly 11. Numbaral 12 designates a synchro transmitter which is mounted on one end of the shaft of the electric motor 11' to have one-to-one correspondence with the rotation of the rotary nozzle assembly 11 featuring a rotary motion. Numeral 13 designates a tundish which is designated to receive molten metal from the ladle 10 and pour the molten metal into a continuous casting mold 14 through a dipped nozzle 15. Numeral 16 designates a tundish liquid level detector which may be designed to directly detect the molten metal level through an eddy current type distance measuring device employing a feedback type amplifier circuit or alternatively the detector may use a detecting method employing a thermometer or the like. Numeral 17 designates a swing tower constituting an equipment whereby when the ladle 10 completes the pouring of molten metal for one charge, the ladle 10 is replaced by another ladle for the second charge. In the Figure, the solid lines indicate power circuits and the dotted lines indicate control circuits. Numeral 18 designates a rotary nozzle control unit comprising a plurality of angle setting devices 20 (adjustable in the range from 0° to 360°) and a control circuit for selecting a predetermined one (as predetermined according to a logical sequence) of the angle setting devices 20 in response to a tundish liquid level signal, and the rotary nozzle control unit 18 is connected to a tundish liquid level detecting unit 19 which computes the level of the molten metal in the tundish 13 in response to a signal detected by the liquid level detector 16. The rotary nozzle control unit 18 is responsive to the output signal of the detecting unit 19 to select the proper one of the angle setting devices 20 in the rotary nozzle control unit 18. The liquid level detecting unit 19 includes a liquid level indicator 21 which indicates the level of the molten metal in the tundish 13 in response to the computation results of the detecting unit 19. Numeral 22 designate manual actuators for the angle setting devices 20.

Figure 7:
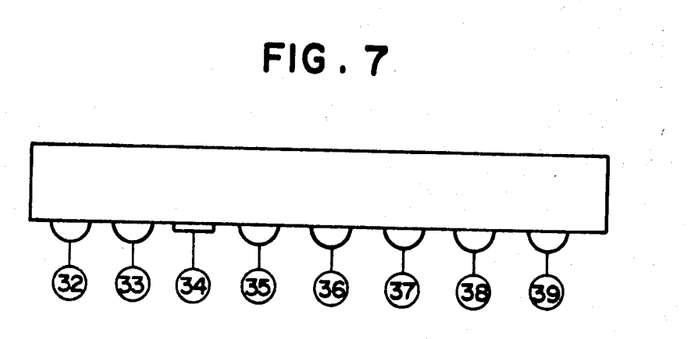
FIG. 7 is a schematic diagram of a tundish liquid level indicator used with the invention.

FIG. 7 is a schematic diagram of the tundish liquid level indicator 21 provided to monitor the automatic pouring operation. In the Figure, numeral 32 designates a rotary nozzle motor overload warning lamp, 33 a power cutoff warning lamp, 34 a buzzer, and 35, 36, 37, 38 and 39 indicator lamps respectively adapted to light when the level of the molten metal in the tundish is at the upper limit position, the upper zone, the intermediate zone, the lower zone and the lower limit position, respectively.

The rotary nozzle control unit 18 should preferably be installed in a continuous casting machine operating room so that the setting of the automatic operating angles, the current value of the electric motor in operation and the position of the nozzles can be monitored in this operating room. When it is desired to change the pattern of the automatic operation, this can be accomplished by changing the angle setting of the angle setting devices 20 of the rotary nozzle control unit 18.

The use of a rotary nozzle assembly is an essential requirement for the present invention mainly on the following reasons.

(i) While nozzles of other types include a single opening, a rotary nozzle can be formed with a plurality of nozzle openings having different diameters, with the result that the nozzle openings can be selectively used in a suitable manner to always allow the wide open pouring during casting and also the amount of pour can be controlled.

(ii) While sliding nozzles of other types are so designed that the sliding plate generally slides on one side of the nozzle opening by a linear motion, the sliding plate of a rotary nozzle can be caused to slide on both sides of the nozzle opening by a rotary motion, with the result that there is less tendency to concentrically damage the nozzle edges and the sliding contact surfaces of the fixed plate and the sliding plate and thus it is possible to ensure a longer useful life for these plates.

(iii) By virtue of a circular motion, the sliding stroke will be 3.14 times that of the linear motion for fixed and sliding plates of the same cross-sectional area.

(iv) Since the refractory bricks, e.g., the fixed plate and sliding plate are held in place by springs, even if the accuracy of setting the fixed and sliding plates in place is more or less rough, there is less danger of causing the unilateral locking of the plates.

(v) As compared with the hydraulic drive, the use of electric drive ensures the elimination of hydraulic units, hoses, cylinders, etc., and moreover the construction is simplified and there is less tendency to cause troubles or malfunction.

(vi) As compared with other types, a rotary nozzle can be used for a large number of times, with the resulting decrease in the amount and frequency of ladle preparatory operation.

(vii) The pouring operation can be effected by means of push buttons instead of manual operation, and the operation can also be remotely handled, thus alleviating heavy labor and deterioration of the working environment.

(viii) Dangerous operations which have heretofore been performed on a ladle in a high temperature environment, e.g., the installation of a stopper can be eliminated with the resulting improvement from the standpoint of safety.

On the other hand, the automated operation by means of the above-mentioned rotary nozzle is essential in view of the following three points.

(a) When casting a series of heats, the ladle pouring operator is required to engage exclusively in the pouring operation for a long period of time.

(b) In order that the temperature of the molten metal in a tundish may be maintained within a predetermined range as far as possible, the molten metal level must always to held within a predetermined range.

(c) The liquid level or the amount of the molten metal in the tundish must also be maintained within a predetermined range as far as possible in order to ensure stable control of the liquid level in a mold.

In accordance with the present invention, the previously mentioned advantages of the rotary nozzle assembly are utilized fully to meet these requirements, and at least a pair of pouring nozzles respectively having a large and small diameter is provided so as to be selectively used as a nozzle, that is, a pouring nozzle whose wide open pouring rate is higher than that required to maintain the previously mentioned reference liquid level is selected as a large nozzle and another pouring nozzle whose wide open pouring rate is smaller than that required to maintain the reference level is selected as a small nozzle. A rotary nozzle assembly including, in addition to these pouring nozzles, a plurality of pouring nozzles, e.g., a very small nozzle designed for preventing the solidification of molten metal when the nozzles are closed fully, a medium nozzle designed for use in case of need, etc., is mounted to the bottom of a ladle.

Next, the flow of the automatic operations of the rotary nozzle control unit 18 will be described. The rotary nozzle assembly is of a so-called endless type which is rotatable through 360° and slidable in either direction, and it is impossible to mechanically determine the fully open and fully closed positions. Consequently, where two pouring nozzles are used, 0° to 360° are divided into four parts so that 0° and 180° represent the fully open positions and 90° and 270° represent the fully closed positions. On the other hand, where three pouring nozzles are used, 0° 360° are divided into six parts so that 0°, 120° and 240° represent the fully open positions and 60°, 180° and 300° represent the fully closed positions. The sequence of operations will now be described with reference to the case employing the two pouring nozlees.

(I) The rotary nozzle assembly is mounted to the ladle and then the angle setting is adjusted so that the wide open nozzle position corresponds to 0°, and the rotary nozzle assembly is automatically stopped at 90° after the wide open nozzle position constituting the starting point.

(II) In this condition, the ladle is filled with molten metal and then it is transported to a continuous casting yard.

(III) After the ladle has been transported to the continuous casting yard, the angle setting device of the rotary nozzle control unit is adjusted to 90° and the pouring is started.

(IV) An operator is present until the level of the molten metal in the tundish reaches a predetermined level as well as to confirm the conditions of the various equipment by visual observation, and thereafter the pouring operation is carried out in an unattended manner or automatically. Firstly, during the initial pouring period the rotary nozzle assembly is rotated by operating a manual operating unit to adjust the large nozzle to 0°, and then the wide open pouring is effected thus raising the level of the molten metal in the tundish to the predetermined reference level in a short period of time.

(V) Then, the small nozzle is adjusted to 180° by manual operation to effect the wide open pouring, and the pouring is carried out while maintaining the liquid level at the predetermined reference level by a balancing pouring which balances the pouring of the molten metal into the tundish with the metal flow to the mold.

(VI) In other words, an operator is present to confirm the conditions of the various equipment by visual observation and until the level of the molten metal in the tundish attains the predetermined reference level, and thereafter the pouring is effected in an unattended manner or automatically.

(VII) During the intermediate period the automatic pouring is accomplished in such a manner that the small and large nozzle are alternately respectively rotated to their fully open positions (0° and 180°) in response to upper and lower limit signals generated in accordance with variations in the level of the molten metal in the tundish, and the liquid level is maintained practically within a predetermined range necessary for the pouring by causing the liquid level to vary on both sides of the predetermined reference level between the upper and lower limit levels.

(VIII) During the final pouring period, a manually operated monitored pouring including the prevention of inclusion of the ladle slage is accomplished.

The above described flow may be summarized as follows.

| (Precondition) | (Signal) | (Resulting condition) |
|---|---|---|---|---|
| (1) | WC | — | manual | — | WO |
| (2) | WO | — | manual | — | SO |
| (3) | SO | — | L | — | WO |
| (4) | WO | — | H | — | SO |
| (5) | WO | — | L manual | — | WC |

-continued

| (Precondition) | (Signal) | (Resulting condition) |
|---|---|---|
| Nozzle opening diameters | | W = large opening diameter |
| | | S = small opening diameter |
| Nozzle conditions | | O = wide open |
| | | C = fully closed |
| Signal conditions | | H = upper limit |
| | | L = lower limit |

Figure 8:
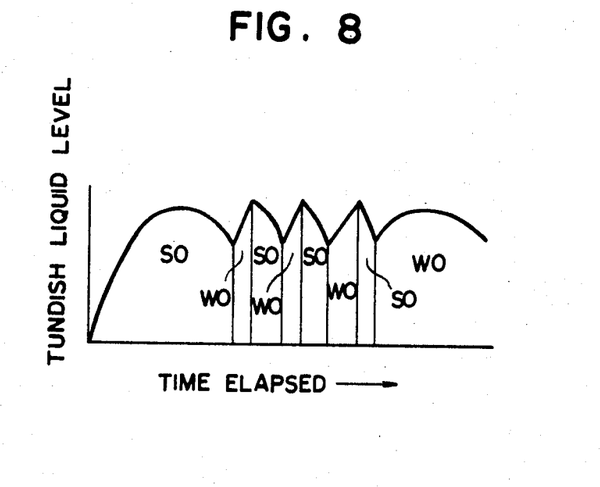
FIGS. 8 and 9 are flow charts showing examples of angle settings for the automatic rotary nozzle pouring method of this invention.
Figure 9:
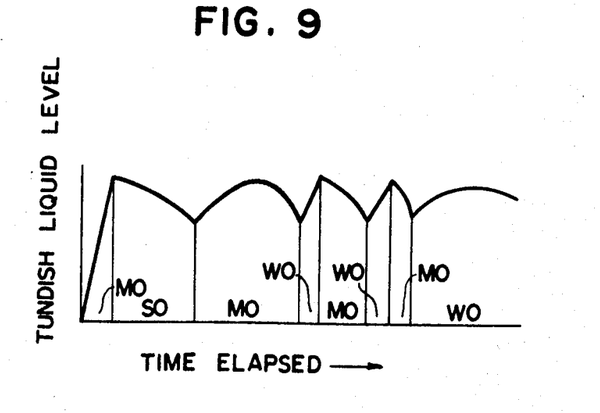

Referring now to FIGs. 8 and 9, there are shown exemplary angle settings for automatic operation of the rotary nozzle assembly according to the invention. FIG. 8 shows the automatic pouring angle setting for effecting alternate shifting between the wide open small nozzle (SO) and the wide open large nozzle (WO), and FIG. 9 shows the angle setting for an automatic pouring operation (employing a rotary nozzle assembly having three nozzles of small, medium and large sizes) in which an automatic transition is effected from the alternate shifting between the wide open small nozzle (SO) and the wide open medium nozzle (MO) to the alternate shifting between the wide open medium nozzle (MO) and the wide open large nozzle (WO). More specifically, with the angle setting shown in FIG. 8, during the initial pouring period the wide open small nozzle is used to balance the pouring of molten metal into the tundish with the delivery of molten metal from the tundish, and from the intermediate pouring period and on the large and small nozzles are used alternately to effect the pouring. The pouring operation is controlled in accordance with the following automatic operation flow and preset angle values.

The automatic operation flow

TABLE I

SO → SO L → WO
WO → H → SO
Preset values of angle setting devices (1) 180° (Wide open small nozzle)
(2) 0° (Wide open large nozzle)

With the angle setting shown in FIG. 9, the pouring is started with the medium nozzle being opened fully, and the automatic wide open pouring is effected by alternately using the medium and small nozzles in such a manner that when the liquid level reaches the lower limit with the wide open medium nozzle, the operation is shifted to the automatic wide open pouring operation in which the medium and large nozzles are alternately used. The pouring operation is controlled in accordance with the following automatic operation flow and preset angle values.

Automatic operation flow

TABLE II

| MO → H → SO | S = small nozzle |
| SO → L → WO | M = medium nozzle |
| MO → L → WO | W = large nozzle |
| WO → H → MO | O = wide open |
| MO → L → WO | |

Preset values of an angle setting devices (1) 120° (wide open medium nozzle)
(2) 0° (wide open large nozzle)
(3) 240° (wide open small nozzle)

Figure 10:
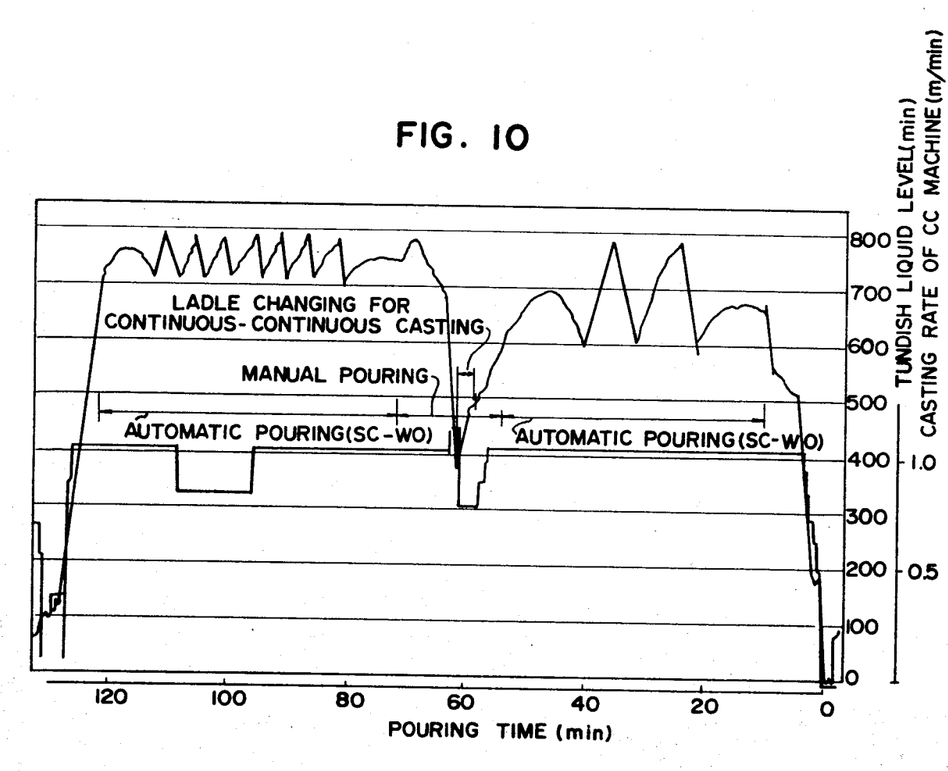
FIG. 10 is an automatic pouring time chart for the continuous casting of metal by the automatic pouring method of this invention.

Referring now to FIG. 10, there is illustrated a time chart for the automatic pouring operation in continuous casting in accordance with the present invention. The Figure relates to a case in which the liquid level detecting unit employed an eddy current distance measuring device. More specifically, the Figure shows the case in which the continuous casting of two heats through automatic pouring was accomplished by alternately opening and closing fully the nozzle openings. In other words, the first heat was continuously poured for about 60 minutes and the resulting upper limit value (H) and lower limit value (L) of the tundish liquid level were respectively H=800 mm and L=600 mm, thus showing the excellent variation conditions of the liquid level and the excellent automatic change-over operation of the nozzles in the rotary nozzle assembly. For purposes of caution, the pouring operation was effected manually for about 18 minutes to watch the run-out of the ladle slag during the latter half of the first heat, effect the ladle changing and confirm the stable operation of the rotary nozzle assembly just after the beginning of the pouring of the second heat. The second heat showed H=800 mm and L=700 mm and the automatic change-over operation between the small and large nozzles was stable, although the number of times of change-over was large. In other words, it will be seen evidently from this time chart that the automatic contral system was stable and the rotary nozzle assembly exhibited excellent pouring characteristic over a long period of 120 minutes, and this really shows that the pouring operation can be standardized. It has also been proved that satisfactory control could be accomplished even if the tolerance range or the upper and lower limits of the tundish liquid level were changed as desired.

It will thus be seen from the foregoing that in accordance with the present invention, the use of a rotary nozzle assembly for pouring molten metal from a ladle into a tundish essentially requires that utterly disregarding the use of throttling pouring from the beginning, the rotary nozzle assembly is provided with a plurality of pouring nozzles of different diameters constituting a feature of the rotary nozzle, and these nozzles of different diameters are selectively used in a suitable manner, thus always pouring the molten metal through the selected wide open nozzle. This fact is very important as an essential requirement for the production of good quality steel.

In other words, with the present invention, at the start of the pouring operation the large nozzle is opened so that the tundish is filled with molten metal to raise in a short period of time the liquid level to an upper limit level in relation to a predetermined reference level so as to prevent decrease in the molten metal temperature and deposition of the solidified metal, after which the large nozzle is closed and the small nozzle is fully opened to accomplish a so-called balanced pouring in which the molten metal is poured from the ladle into the tundish in proportion to a drop in the tundish liquid level. In this case, however, if the liquid level is raised slightly further, the small pouring nozzle will be fully closed so long as the liquid level stays higher than the upper limit level. During the intermediate pouring period where the amount of pour tends to become insufficient due to a decrease in the static pressure of the molten metal in the ladle, decrease in the opening area of the rotary nozzle openings due to the deposition of alumina thereto, etc., the small nozzle is closed and the large nozzle is fully opened again thus accomplishing a wide open-fully closed-wide open control, and this method is made possible through selective use of the plurality of nozzles of different diameters in response to the rotary motion of the rotary nozzle assembly. The fact that the rotary nozzle is capable of making a rotary motion in any circumferential direction, contributes toward making the method more advantageous. This on-off control of the pouring nozzles will be effected entirely in response to the level signals from the tundish liquid level detecting unit.

Figure 12:
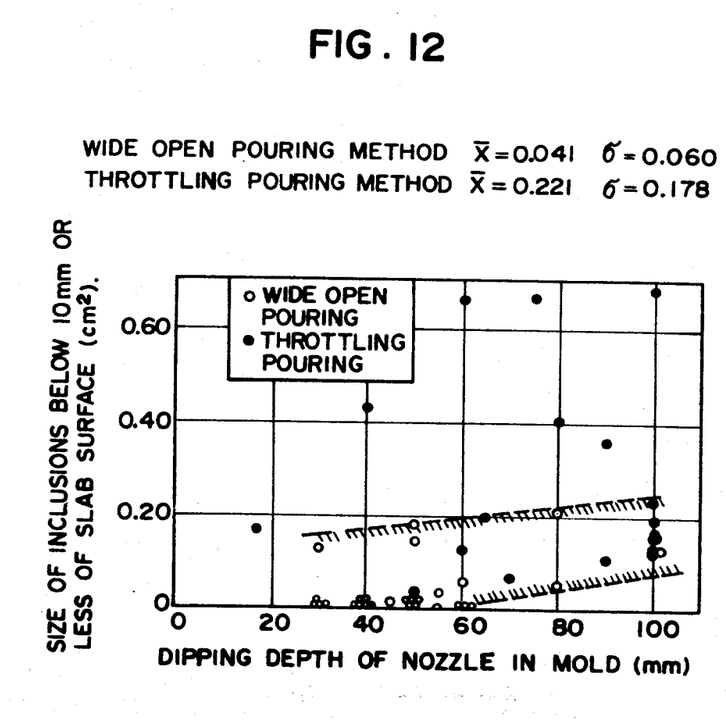
FIG. 12 is a graph showing the relationship between the depth of the nozzle in the mold and the occurrence of non-metallic inclusions (size and number) below the surface layer of cast slabs obtained with the method (wide open pouring) of this invention and the throttling pouring, respectively.
Figure 13A:
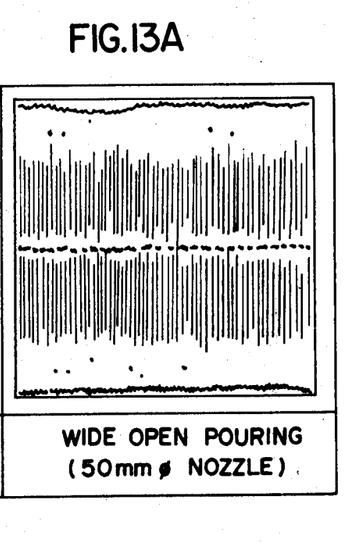
Figure 13B:
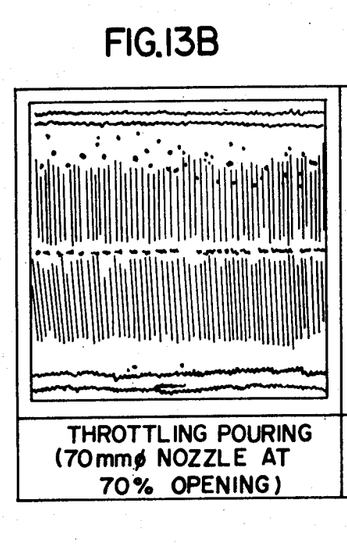

In accordance with the automatic molten metal pouring method of this invention, the oxidation of the poured molten metal by air can be prevented, in particular the amount of non-metallic inclusions in the vicinity of the surface layer of cast slabs of aluminum killed steel for cold rolling can be reduced to about one fifth of that obtained by the prior art method, and moreover the amount of large-sized inclusions trapped in the cast slabs can also be decreased, thus greatly increasing the yield in the manufacture of first class and special class cold rolled sheets. This fact will be explained with reference to the graph of FIG. 12 showing the relationship between the occurrence (size and number) of non-metallic inclusions below the surface layer of cast slabs and the depth of dipping of the nozzle in the mold and the schematic diagrams of FIG. 13 showing the uneven distribution of the inclusions caused by the throttled pouring and wide open pouring, respectively. A method of reducing the amount of inclusions in the surface of sheet slabs is known in the art in which the surface temperature of the molten metal in a mold is maintained 30° to 40° C. higher than the solidification starting temperature and the non-metallic inclusions floated to and separated at the surface are removed by absorbing them with mold powder. As a means of performing this method, the depth of dipping of the nozzle in the molten metal of the mold is decreased, so that the flow of the molten metal at the surface will be made more active owing to the reduced dipping depth of the nozzle and consequently the molten metal temperature will be maintained high. As will be seen from FIG. 12, a comparative study of the amount of $Al_2O_3$ non-metallic inclusions of over 200$\mu$ in the continuously cast slabs for sheet has shown that in the case of the throttled pouring the number of the surface inclusions was about 5 times that of the wide open pouring and moreover the variation in the amount was about 3 times that of the wide open pouring. It is also known in the art that in the case of slabs produced by the continuous casting method, a concentrated distribution of non-metallic inclusions is seen in the area ¼ to 1/5 of the slab section in the thickness direction (t). FIG. 13 shows traced copies of the photographs showing the results of the macro-etching tests conducted on the continuously cast slabs for sheet so as to see the effects of the throttled pouring and the wide open pouring on the concentrated distribution of non-metallic inclusions at the ¼ t. As will be seen from the Figure, in the case of the slab produced by the throttled pouring there was a concentrated distribution of a large number of large-sized inclusions caused by the previously mentioned air oxidation at the position which was ¼ inside the slab upper surface, and in the case of the slab produced by the wide open pouring such concentrated distribution of non-metallic inclusions was greatly reduced owing to a great decrease in the oxidation of molten metal by air.

Also, in accordance with the present invention, the pouring of molten metal from a ladle into a tundish is accomplished automatically throughout the pouring time except a partial manual operation carried out during the initial pouring period as well as the final pouring period. As a result, a ladle pouring operator may be allowed to leave his operating position during the automatic pouring operation. By virtue of the use of this automatic pouring, not only the operator may be released from labor requiring a high degree of tension in a high temperature environment, that is, labor of pouring molten metal while watching the surface level of the molten metal in the tundish throughout the pouring operation, but also the operator may be allowed to perform some additional operations, such as, some of a series of operations constituting part of the casting operation during the automatic pouring operation, as follows.

(1) 7 min/oper×4 of the sampling and sample feeding.
(2) 10 min/oper×2 of the preparatory operation including the transportation of tundish heat retaining agent, etc.
(3) 5 min/oper×2 of the operation for receiving the second heat ladle and returning the first heat ladle during the continuous-continuous casting.

Thus, saving of labor for the operator as well as the pouring assistant is made possible. Experiments conducted showed that the total labor time of the ladle pouring operator and assistant was reduced from 190 minutes to 100 minutes, i.e., a decrease of 47%, and the pouring assistant was required to engage himself in the operation only for 12 minutes.

The advantages of the present invention may be summarized as follows.

(A) Improved cast slab quality (decreased inclusions) due to prevention of oxidation of molten metal stream supplied from a ladle into a tundish.

(B) Decreased melting loss of the refractory bricks, e.g., fixed plate, sliding plate, etc.

(C) Saving of labor and increased range of operations for the ladle pouring operator.

(D) Reduction in the density of pouring monitoring operation.

(E) Standardization of the pouring operation.

(F) Easy control of the level of molten metal in the tundish.

(G) Reduced variation in the temperature of molten metal in the tundish.

(H) Reduced variation in the level of molten metal in the tundish with the resulting reduction in the oxidation (oxidation of the tundish walls due to decrease in the surface level of molten metal).

We claim:

1. A method for automatic pouring of molten metal between a ladle and a tundish, said tundish is provided with a level detector, and employing circuit means designed for feedback of signals supplied from the level detector, said ladle including a rotary opening and closing means together with a plurality of large and small diameter nozzles, and control means for controlling said rotary opening and closing means through feedback signals from said circuit, automatically selecting a small diameter nozzle when the molten metal level in the tundish exceeds an upper level, and automatically selecting the larger diameter nozzle with full opening when said lever has lowered to below a lower level, selection of said respective nozzle diameters being responsive to signals received from said level detector; comprising the steps of: employing a plurality of pouring nozzles with at least one of a first nozzle having a pouring rate at full opening larger than the rate necessary for maintaining a reference level in a tundish and at least one of a second nozzle from the first nozzle to provide a pouring rate at full opening smaller than a rate necessary for maintaining a reference pouring rate, selectively controlling said pouring nozzles by full opening or closing in response to the level of molten metal in the tundish and selecting from a plurality of pouring nozzles of different diameters, a large nozzle having a pouring rate at wide open pouring greater than that required to maintain said reference level, and a small nozzle having a pouring rate at wide open pouring slightly greater than that required to maintain said reference level during an initial pouring period, said small nozzle pouring rate becoming, after said initial period smaller than that required to maintain said reference level and switching back and forth for a plurality of times, each of said respective nozzles during the pouring cycle.

2. A method as set forth in claim 1, comprising the steps of: selecting of said plurality of pouring nozzles of different diameters a large nozzle whose pouring rate for wide open pouring in greater than that required to maintain said reference level, and a medium nozzle whose pouring rate for wide open pouring is greater than that required to maintain said reference level until near an intermediate pouring period, said medium nozzle pouring rate becoming after said intermediate pouring period, smaller than that required to maintain said reference level.

3. A method as set forth in claim 1, comprising the steps of: selecting at least one another pouring nozzle whose pouring rate for wide open pouring is smaller than that required to maintain said reference level, comprising a small nozzle and a medium nozzle.

4. A method as set forth in claim 1, comprising the steps of: selecting said plurality of pouring nozzles of different diameters to include a very small solidication preventive nozzle whose pouring rate for wide open pouring is smaller than that required to maintain said reference level throughout an entire pouring period.

* * * * *